United States Patent
Sanftl et al.

(10) Patent No.: US 12,174,293 B2
(45) Date of Patent: Dec. 24, 2024

(54) LOW PHASE NOISE RADAR SYSTEM

(71) Applicant: GM CRUISE HOLDINGS LLC, San Francisco, CA (US)

(72) Inventors: Benedikt Sanftl, Riedering (DE); Florian von Detten, Holzkirchen (DE); Richard Koerber, Ottobrunn (DE); Felix Hoehne, Aschheim (DE); Markus Klose, Ottobrunn (DE); Mehmet Serhat Ay, Poing (DE); Gustavo Adolfo Guarin Aristizabal, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 343 days.

(21) Appl. No.: 17/715,519

(22) Filed: Apr. 7, 2022

(65) Prior Publication Data

US 2023/0314600 A1    Oct. 5, 2023

(30) Foreign Application Priority Data

Mar. 29, 2022  (EP) .................................... 22165142

(51) Int. Cl.
  *G01S 13/931* (2020.01)
  *G01S 7/35* (2006.01)
  *G01S 13/32* (2006.01)
(52) U.S. Cl.
  CPC ............ *G01S 13/931* (2013.01); *G01S 7/352* (2013.01); *G01S 13/32* (2013.01)
(58) Field of Classification Search
  None
  See application file for complete search history.

(56) References Cited

U.S. PATENT DOCUMENTS

| | | | | |
|---|---|---|---|---|
| 5,861,834 A | * | 1/1999 | Sauer | G01S 13/32 |
| | | | | 342/194 |
| 8,085,877 B2 | * | 12/2011 | Rofougaran | H04L 27/362 |
| | | | | 375/232 |
| 9,659,249 B1 | | 5/2017 | Copel | |

(Continued)

FOREIGN PATENT DOCUMENTS

| | | |
|---|---|---|
| EP | 4254002 | 10/2023 |
| GB | 2465755 A | 6/2010 |
| WO | 2013147948 A2 | 10/2013 |

OTHER PUBLICATIONS

PCT Search Report and Written Opinion for PCT/US22/72117, date of mailing Aug. 1, 2022, 7 pages.

(Continued)

*Primary Examiner* — Bernarr E Gregory
(74) *Attorney, Agent, or Firm* — Michael DiCato

(57) ABSTRACT

A low phase noise radar system is disclosed. The system has a signal generator having a stable oscillator that outputs a first lower-frequency signal, a direct digital synthesis circuit that outputs an analog waveform, and a mixer to receive the first lower-frequency signal, and the analog waveform, the mixer to mix the first lower-frequency signal and the analog waveform to generate a signal generator output signal. The system further includes an up converter coupled with the signal generator to filter and to increase frequencies of the signal generator output signal to generate a filtered and frequency multiplied signal to be transmitted.

20 Claims, 8 Drawing Sheets

(56) References Cited

U.S. PATENT DOCUMENTS

| | | | | |
|---|---|---|---|---|
| 9,831,881 B2* | 11/2017 | Josefsberg | .............. | H03L 7/085 |
| 10,222,462 B2* | 3/2019 | Brown | .................... | G01S 13/34 |
| 10,598,764 B2* | 3/2020 | Josefsberg | ............ | G01S 13/931 |
| 10,802,994 B1 | 10/2020 | Ge | | |
| 2002/0097081 A1 | 7/2002 | Razavi | | |
| 2008/0307151 A1 | 12/2008 | Mouttet | | |
| 2010/0090886 A1* | 4/2010 | Beasley | .................. | G01S 7/352 |
| | | | | 342/200 |
| 2011/0227784 A1* | 9/2011 | Beasley | .................. | G01S 7/354 |
| | | | | 375/295 |
| 2015/0015431 A1 | 1/2015 | Trotta | | |
| 2015/0170025 A1 | 6/2015 | Wu | | |
| 2019/0189174 A1 | 6/2019 | Hu | | |

OTHER PUBLICATIONS

Extended European Search Report for EP Application No. 22165142.5 dated Sep. 12, 2022, 9 pages.

\* cited by examiner

LOW PHASE NOISE RADAR SYSTEM

The present application claims priority to European Patent Application No. EP 22165142.5, filed on Mar. 29, 2022, the contents of which are incorporated herein by reference in their entirety.

TECHNICAL FIELD

Examples provided herein relate to monitoring and evaluating road users (e.g., vehicles, cyclists, pedestrians, pets). More particularly, examples provided herein related to assessment of a host vehicle operating environment based on information gathered through monitoring other road users.

BACKGROUND

Automotive radar systems are increasingly used in human-operated vehicles as well as autonomous vehicles. An autonomous vehicle (AV) is a vehicle that can operate itself by performing necessary control operations without human interaction through use of an automated driving system. AVs have the ability to monitor its surroundings through use of various sensors and respond to external conditions in a manner to allow the AV to navigate a selected route.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Current commercial automotive radar systems are based on phase locked loop (PLL) and voltage control oscillator (VCO) architectures. Design of systems based on the PLL and VCO combination involves a tradeoff between settling time (PLL bandwidth) and phase noise in the system. The result is that the PLL and VCO based automotive radar systems suffer from either high phase noise or slow settling times. This architecture results in sub-optimal performance.

In frequency-modulated continuous-wave (FMCW) radar systems, for example, phase noise can result in sidelobes. Sidelobes are areas of energy that are outside of the main beam of the radar detection after processing (e.g., range, velocity, angular data) the baseband signal. Detection sidelobes can cause false detections or can superimpose weak detections, making them undetectable. As discussed above, PLL and VCO based automotive radar systems can suffer from high phase noise, which can result in sidelobes.

Sidelobes of a strong target (e.g., a delivery truck) can shadow weaker targets (e.g., cyclist, pedestrian). Thus, for high-resolution radar systems (e.g., automotive radar systems), it is desirable to have low phase noise to reduce sidelobes and detect weak targets that are physically close to strong targets. As discussed above, in PLL and VCO based automotive radar systems, a tradeoff is required so that decreasing phase noise in an attempt to reduce sidelobes will result in slower frequency settling times, which limits FMCW repetition rates. Further, fast frequency hopping is not possible with PLL and VCO based systems.

In the example systems described below, heterodyne combination of signals of a low phase noise oscillator signal and a direct digital synthesis (DDS) signal can function to decouple the relationship between settling time and phase noise and reduce or eliminate the shortcomings discussed above. The settling time of low-noise oscillator and DDS configuration diminishes in importance because the PLLs of the system remain at a single frequency point after power up. Other examples can include an all-digital PLL and digitally controlled oscillator (DCO) based architecture. The low phase noise frequency synthesizer based architecture and DDS (or DCO) can be utilized to generate a carrier signal. In an example, a small filter loop bandwidth can be used for a static PLL frequency to optimize phase noise performance. Additional phase noise from the DDS can be negligible and the digitally-generated ramp has no constraints regarding settling time, ramp slope and repetition rate.

In the description that follows, specific example circuits are provided that utilize a low phase noise oscillator and DDS circuit based architecture for use in automotive radar systems. The resulting automotive radar system architecture can provide improved resolution and a higher performance automotive radar system that could be archived utilizing a PLL and VCO based architecture.

Figure 1:
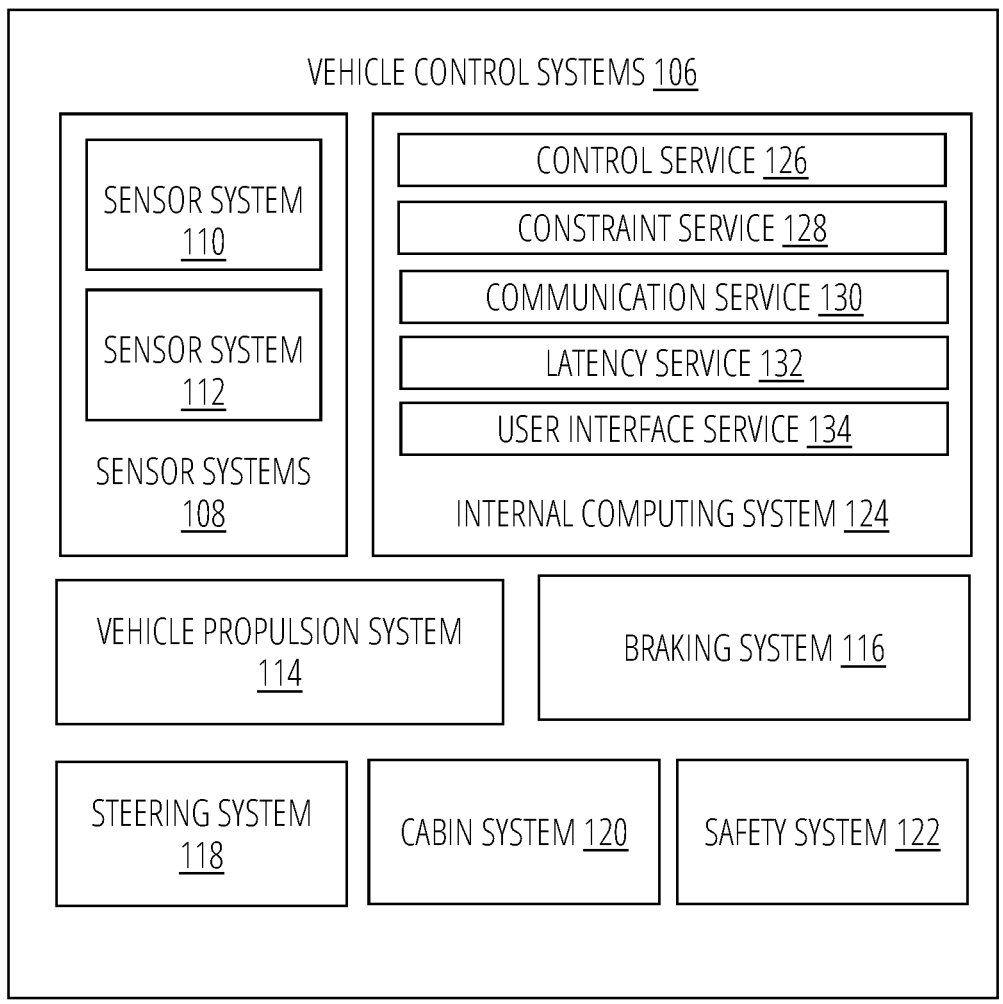
FIG. 1 is a block diagram of an example of a vehicle having a RADAR system as described herein.
Figure 1:
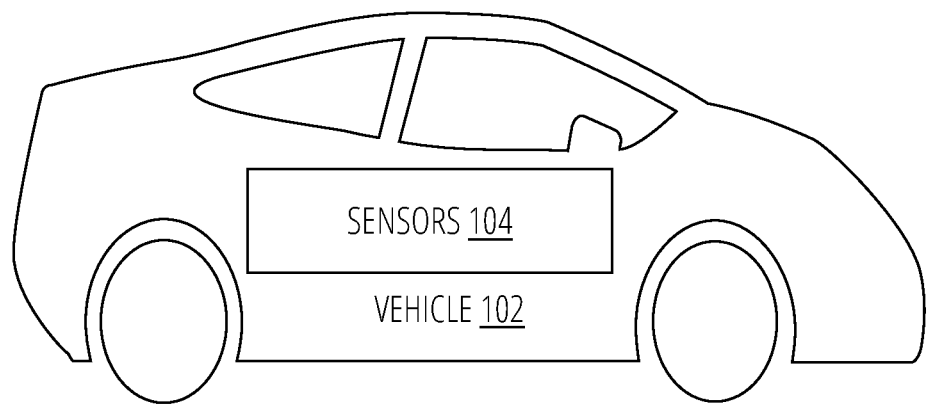

FIG. 1 is a block diagram of an example vehicle having a RADAR system as described herein. In one example, vehicle 102 is an autonomous vehicle that has the functionality to navigate roads without a human driver by utilizing sensors 104 including RADAR systems and vehicle control systems 106. As another example, vehicle 102 can be a human-operated vehicle having an advanced driver assistance system (ADAS) that can utilize vehicle control systems 106 including radar systems within vehicle 102.

Vehicle 102 can include, for example, sensor systems 108 including any number of sensor systems (e.g., sensor system 110, sensor system 112). Sensor systems 108 can include various types of sensors that can be arranged throughout vehicle 102. For example, sensor system 110 can be a camera sensor system. As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

The various radar systems of vehicle 102 can utilize the architecture described below with respect to, for example, FIG. 2, FIG. 3 and FIG. 6. Specifically, one or more of the radar systems of vehicle 102 can utilize the low phase noise oscillator and DDS circuit based architecture described herein. In general, the radar systems described herein are frequency-modulated continuous-wave (FMCW) radar systems. The FMCW radar systems transmit a chirp, or a pulse with a frequency that rises during transmission. The difference between the frequency of the chirp at transmission and the frequency of the received reflection is related to the distance to the reflecting object.

Vehicle 102 can further include mechanical systems to control and manage motion of vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of vehicle 102. Steering system 118 can include components that control the direction of vehicle 102. Cabin system 120 can include, for example, cabin temperature control systems, in-cabin infotainment systems and other internal elements.

Safety system 122 can include various lights, signal indicators, airbags, systems that detect and react to other vehicles. Safety system 122 can include one or more radar systems. Automobiles can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems typically operate in the 77 GHz band (e.g., 76-81 GHz). SRR systems can be used, for example, for blind spot detection or collision avoidance. SRR systems typically operate in the 24 GHz band. MRR systems can operate in either the 24 GHz band or the 77 GHz band. Other frequency bands can also be supported.

Vehicle 102 can further include internal computing system 124 that can interact with sensor systems 108 as well as the mechanical systems (e.g., vehicle propulsion system 114, braking system 116, steering system 118, cabin system 120, safety system 122). Internal computing system 124 includes at least one processor and at least one memory system that can store executable instructions to be executed by the processor. Internal computing system 124 can include any number of computing sub-systems that can function to control vehicle 102. Internal computing system 124 can receive inputs from passengers and/or human drivers within vehicle 102.

Internal computing system 124 can include control service 126, which functions to control operation of vehicle 102 via, for example, the mechanical systems as well as interacting with sensor systems 108. Control service 126 can interact with other systems (e.g., constraint service 128, communication service 130, latency service 132, internal computing system 124) to control operation of vehicle 102.

Internal computing system 124 can also include constraint service 128, which functions to control operation of vehicle 102 through application of rule-based restrictions or other constraints on operation of vehicle 102. Constraint service 128 can interact with other systems (e.g., control service 126, communication service 130, latency service 132, user interface service 134) to control operation of vehicle 102.

Internal computing system 124 can further include communication service 130, which functions to control transmission of signals from, and receipt of signals by, vehicle 102. Communication service 130 can interact with safety system 122 to provide the waveform sensing, amplification and repeating functionality described herein. Communication service 130 can interact with other systems (e.g., control service 126, constraint service 128, latency service 132, user interface service 134) to control operation of vehicle 102.

Internal computing system 124 can also include latency service 132, which functions to provide and/or utilize timestamp information on communications to help manage and coordinate time-sensitive operations within internal computing system 124 and vehicle 102. Thus, latency service 132 can interact with other systems (e.g., control service 126, constraint service 128, communication service 130, user interface service 134) to control operation of vehicle 102.

Internal computing system 124 can further include user interface service 134, which functions to provide information to, and receive inputs from, human passengers within vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of vehicle 102.

Internal computing system 124 can function to send and receive signals from vehicle 102 regarding reporting data for training and evaluating machine learning algorithms, requesting assistance from a remote computing system or a human operator, software updates, rideshare information (e.g., pickup, dropoff), etc.

Figure 2:
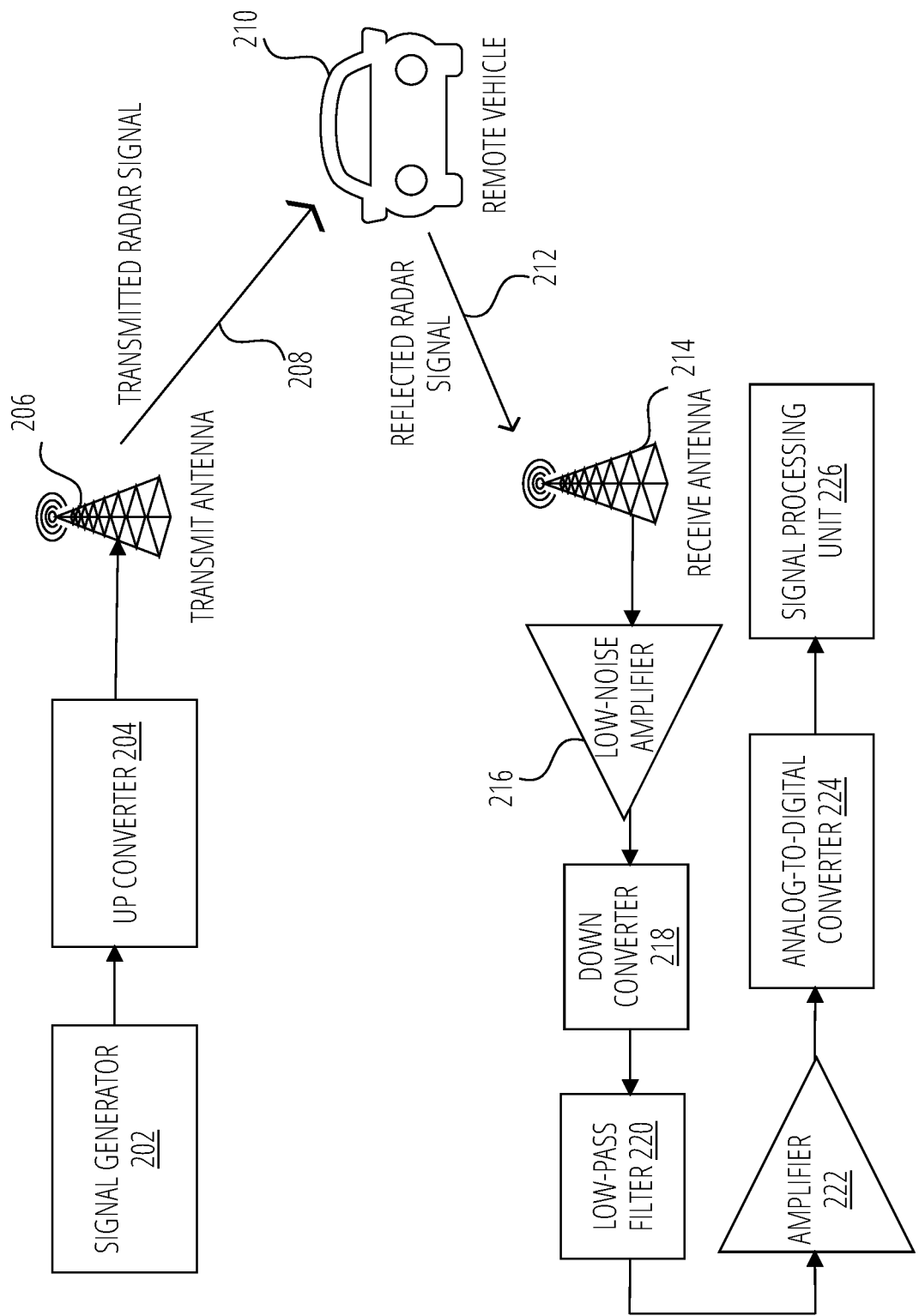
FIG. 2 is a block diagram of an example automotive radar system having a signal generator with a low phase noise oscillator and a direct digital synthesis circuit, the automotive radar system also having an up converter.

FIG. 2 is a block diagram of an example automotive radar system having a signal generator with a low phase noise oscillator and a direct digital synthesis circuit, the automotive radar system also having an up converter. The radar system of FIG. 2 can be, for example, one of sensor systems 108. The example automotive radar system of FIG. 2 can provide improved resolution and a higher performance automotive radar system than could be archived utilizing a PLL and VCO based architecture.

As described in greater detail below, signal generator 202 can utilize a stable local oscillator (STALO) circuit and a direct digital synthesis (DDS) circuit to generate a signal to be transmitted from, for example, a host platform (e.g., vehicle 102). In one example, the host platform can be an autonomous vehicle. In another example, the host platform can be a human-operated vehicle having an advanced driver assistance system (ADAS).

In the example architecture of FIG. 2, the heterodyne combination of a low phase noise PLL (e.g., a stable local oscillator) signal and a DDS signal within signal generator 202 decouples the relation between settling time and phase noise. Further, settling time of the PLL is no longer a limiting factor because the low phase noise PLL remains at a static frequency after power up.

The signal generated by signal generator 202 can be filtered, multiplied and amplified by up converter 204 to generate a radar frequency signal to be transmitted by transmit antenna 206 as transmitted radar signal 208. One example architecture for signal generator 202 is provided in greater detail in FIG. 3. One example architecture for up converter 204 is provided in greater detail in FIG. 6. Other architectures based on the concepts illustrated in FIG. 3, FIG. 4 and FIG. 6 to generate a radar frequency signal can also be utilized.

Figure 3:
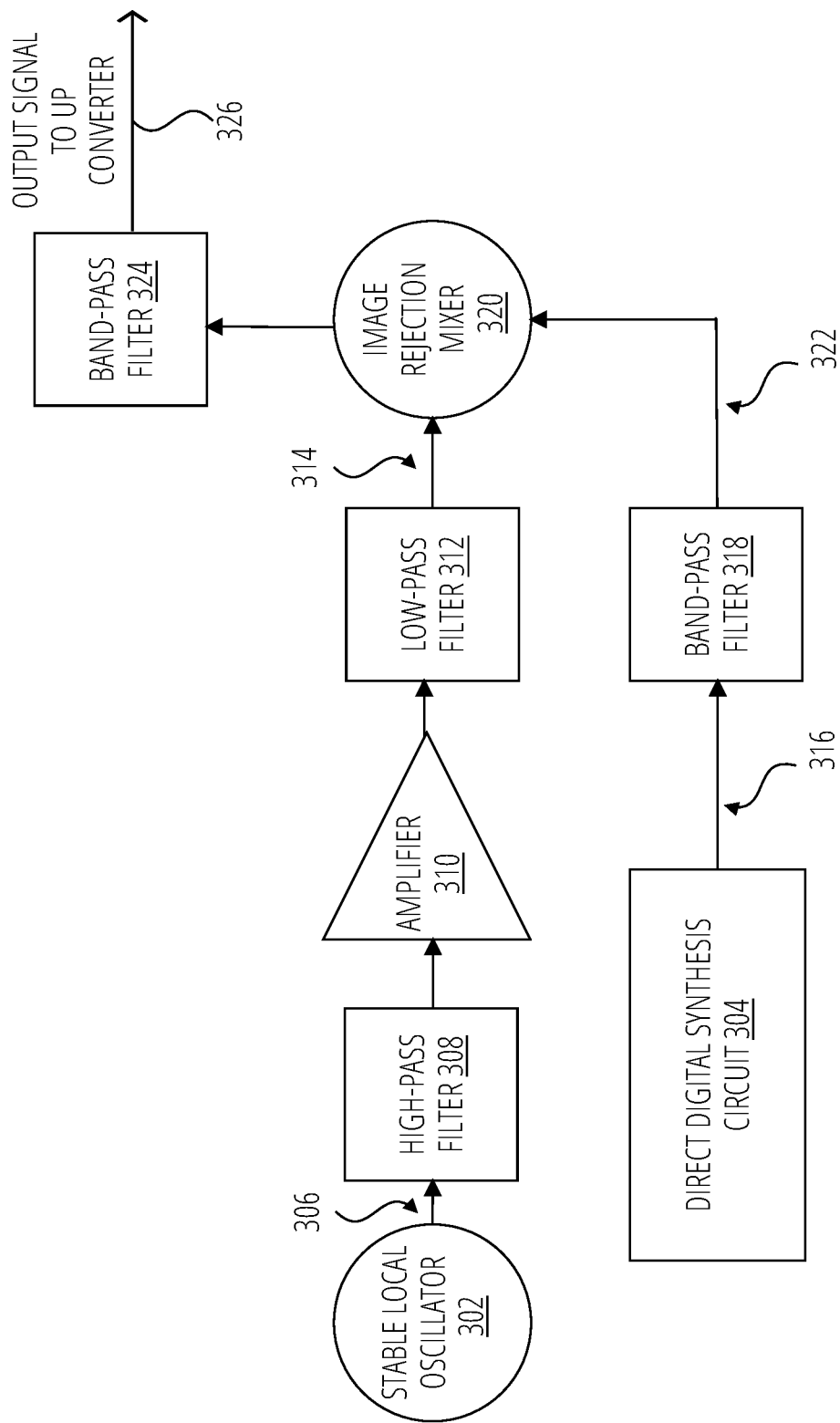
FIG. 3 is a block diagram of a first example signal generator having a low phase noise oscillator and a direct digital synthesis circuit that can be used in an automotive radar system.
Figure 6:
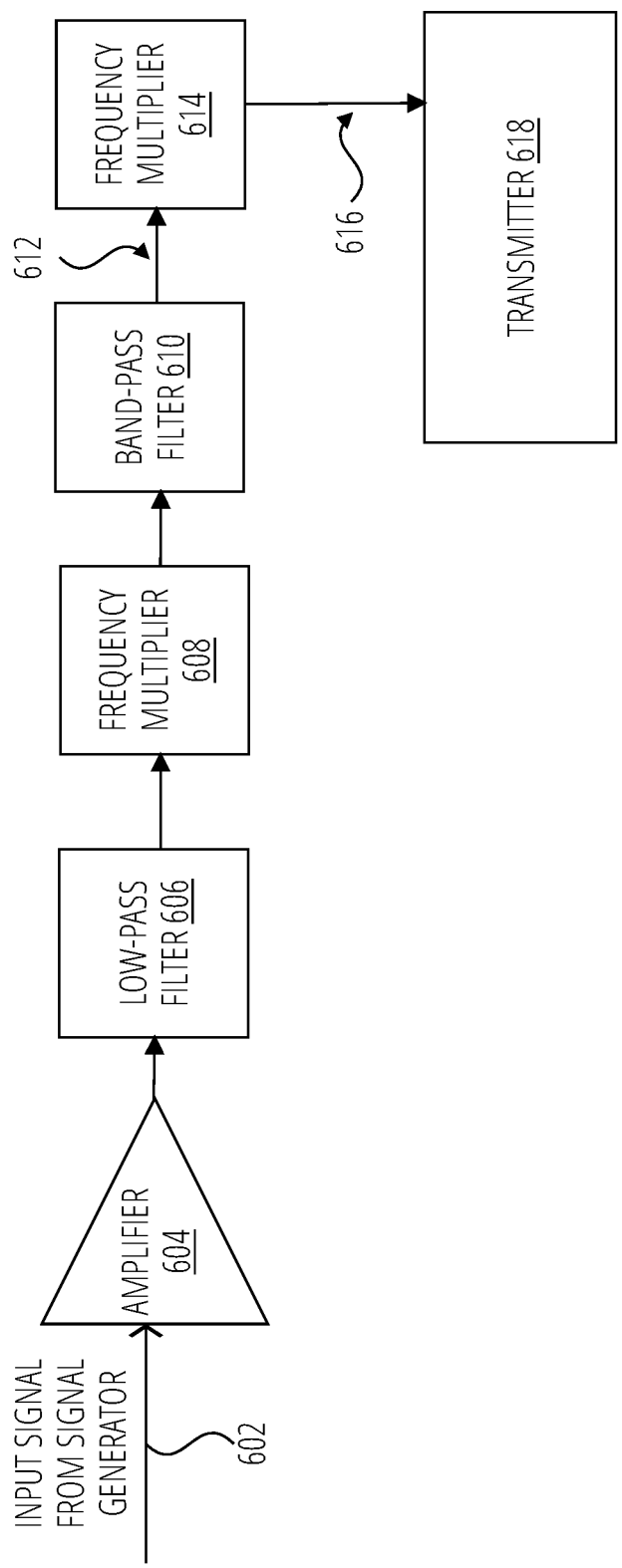
FIG. 6 is a block diagram of an example up converter that can be used in an automotive radar system.

In contrast to the circuits of FIG. 2, FIG. 3 and FIG. 6, current FMCW automotive radar systems are based on a local voltage controlled oscillator (VCO) to generate a frequency modulated continuous wave signal (a chirp) that can be amplified and transmitted. As mentioned above, these VCO-based FMCW automotive radar systems require design tradeoffs that can result in less than optimal performance. The example architectures of FIG. 2, FIG. 3 and FIG. 6 can provide a system that can overcome some or all of the shortcomings of current automotive radar systems.

Transmitted radar signal 208 can be reflected by a remote object, for example, remote vehicle 210. Reflected radar signal 212 is detected by receive antenna 214. The received reflected radar signal 212 from receive antenna 214 can be amplified by low-noise amplifier 216. The amplified signal can be down converted by down converter 218 and filtered by low-pass filter 220. The filtered signal can be amplified by amplifier 222 and the output of amplifier 222 can be digitized by analog-to-digital converter 224 and processed by signal processing unit 226 by performing fast Fourier transforms (FFTs) and other processing. The FFT processing can be utilized to, for example, calculate the distance from the time of flight that is indirectly given with the frequency offset of the transmitted and received ramp. The FFT processing can also calculate the velocity and angle.

FIG. 3 is a block diagram of a first example signal generator having a low phase noise oscillator and a direct digital synthesis circuit that can be used in an automotive radar system. The example signal generator of FIG. 3 can function as signal generator 202 of FIG. 2. As mentioned above, the lower-frequency (e.g., below radar frequency) use of a stable local oscillator 302 and direct digital synthesis circuit 304 to generate the radar signal can result in reduced phase noise without introduction of increased settling time. Thus, the architectures of FIG. 3 and FIG. 6 can provide an overall improvement in, for example, automotive radar systems.

In the examples that follow specific frequencies and frequency ranges are provided. These are merely examples and other frequencies and frequency ranges could be utilized. The illustrated approach can be utilized in other applications as well.

In one example, stable local oscillator 302 (STALO) functions to provide fixed, constant, low phase noise output signals of a selected frequency (i.e., lower-frequency signal 306). In other examples, different low phase noise PLL circuits can be used. An input reference oscillator (not illustrated in FIG. 3) can be used to produce the time domain pulse train. Lower-frequency signal 306 generated by stable local oscillator 302 is a significantly lower frequency than the final output radar signal (e.g., transmitted radar signal 208). Lower-frequency signal 306 can be, for example, a selected fraction of the final radar signal. In an example, lower-frequency signal 306 can be in the range of 8-12 GHz (e.g., 8.5 GHz, 9 GHz, 11 GHz). As another example, lower-frequency signal 306 can be in the range of 17-22 GHz (e.g., 17.5 GHz, 18 GHz, 20 GHz). Lower-frequency signal 306 can be filtered by high-pass filter 308 and amplified by amplifier 310, which is then filtered by low-pass filter 312. The result can be intermediate oscillator signal 314.

In one example, direct digital synthesis circuit 304 functions to produce analog waveform 316 by generating a time-varying signal in digital form and then performing a digital-to-analog conversion on the digital signal to generate analog waveform 316. Analog waveform 316 is also a significantly lower frequency than the final output radar signal. In one example, analog waveform 316 is in the range of 700 MHz to 1100 MHz. In alternate examples, other frequency ranges (e.g., 1.4 GHz to 2.2 GHz, 2.1 GHz to 3.3 GHz or other frequency ranges) can be supported.

Because operations within direct digital synthesis circuit 304 are primarily digital, direct digital synthesis circuit 304 can provide fast switching between output frequencies, good frequency resolution and operation over a broad range of frequencies. In one example, analog waveform 316 from direct digital synthesis circuit 304 can be filtered by band-pass filter 318 and provided to image rejection mixer 320.

In one example, image rejection mixer 320 provides image rejection and mixing of signals generated by stable local oscillator 302 and by direct digital synthesis circuit 304. In an example, image rejection mixer 320 is a sideband rejection mixer that can mix intermediate oscillator signal 314 and filtered analog waveform 322. The output signal from image rejection mixer 320 can be filtered by band-pass filter 324 to generate output signal to up converter 326 to be further processed by, for example, the up converter architecture of FIG. 6. In an example, output signal to up converter 326 is a higher-frequency signal than either lower-frequency signal 306 or analog waveform 316.

Figure 4:
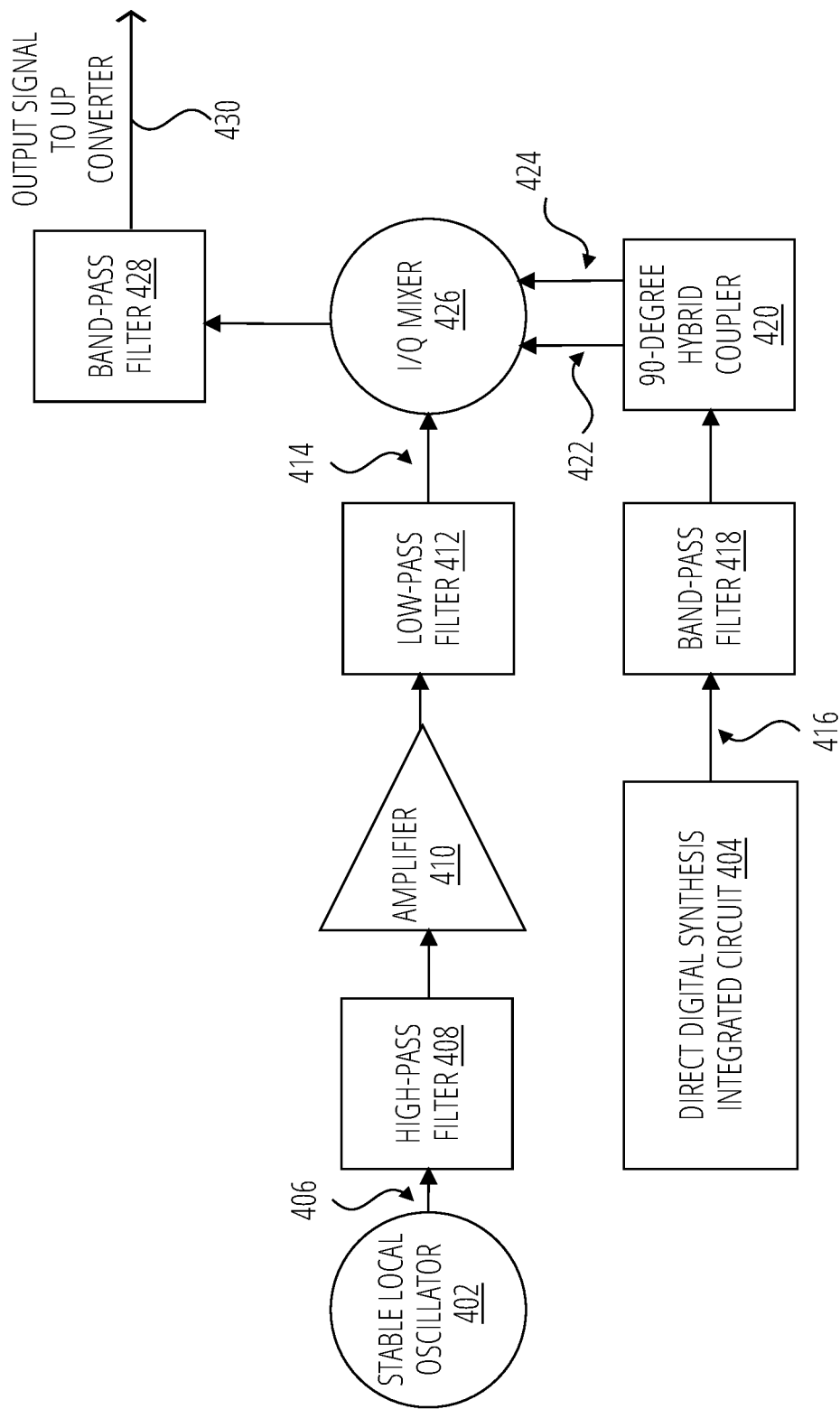
FIG. 4 is a block diagram of a second example signal generator having a low phase noise oscillator and a direct digital synthesis circuit that can be used in an automotive radar system.

FIG. 4 is a block diagram of a second example signal generator having a low phase noise oscillator and a direct digital synthesis circuit that can be used in an automotive radar system. The example signal generator of FIG. 4 can function as signal generator 202 of FIG. 2. As mentioned above, the lower-frequency (e.g., below radar frequency) use of stable local oscillator 402 and direct digital synthesis integrated circuit 404 to generate the radar signal can result in reduced phase noise without introduction of increased settling time. Thus, the architectures of FIG. 4 and FIG. 6 can provide an overall improvement in, for example, automotive radar systems.

In the examples that follow specific frequencies and frequency ranges are provided. These are merely examples and other frequencies and frequency ranges could be utilized. The illustrated approach can be utilized in other applications as well.

In one example, stable local oscillator 402 (STALO) functions to provide fixed, constant, low phase noise output signals of a selected frequency (i.e., lower-frequency signal 406). In other examples, different low phase noise PLL circuits can be used. In one example, stable local oscillator 402 includes a comb generator that uses a timer periodic sequence of pulses to produce a frequency domain periodic sequence. An input reference oscillator (not illustrated in FIG. 4) can be used to produce the time domain pulse train. In an example, lower-frequency signal 406 can be in the range of 8-12 GHz (e.g., 8.5 GHz, 9 GHz, 11 GHz). As another example, lower-frequency signal 406 can be in the range of 17-22 GHz (e.g., 17.5 GHz, 18 GHz, 20 GHz). Lower-frequency signal 406 can be filtered by high-pass filter 408 and amplified by amplifier 410, which is then filtered by low-pass filter 412. The result can be intermediate oscillator signal 414.

In one example, direct digital synthesis integrated circuit 404 functions to produce analog waveform 416 by generating a time-varying signal in digital form and then performing a digital-to-analog conversion on the digital signal to generate analog waveform 416. Analog waveform 416 is also a significantly lower frequency than the final output radar signal. In one example, analog waveform 416 is in the range of 700 MHz to 1100 MHz. In alternate examples, other frequency ranges (e.g., 1.4 GHz to 2.2 GHz, 2.1 GHz to 3.3 GHz) can be supported.

Because operations within direct digital synthesis integrated circuit 404 are primarily digital, direct digital synthesis integrated circuit 404 can provide fast switching between output frequencies, good frequency resolution and operation over a broad range of frequencies. In one example, analog waveform 416 from direct digital synthesis integrated circuit 404 can be filtered by band-pass filter 418 and provided to 90-degree hybrid coupler 420.

In one example, 90-degree hybrid coupler 420 can function to equally split the filtered signal from band-pass filter 318 into two split signals (first split signal 422 and second split signal 424) with a 90-degree phase shift between the two split signals. First split signal 422 and second split signal 424 from 90-degree hybrid coupler 420 can be provided to I/Q mixer 426, which also receives intermediate oscillator signal 414.

While the example of FIG. 3 utilizes an image rejection mixer (e.g., image rejection mixer 320) that takes as one input filtered analog waveform 322 from band-pass filter 318, the example of FIG. 4 utilizes I/Q mixer 426, which can be, in an example, a single sideband mixer that takes first split signal 422 and second split signal 424 as inputs. Utilization of I/Q mixer 426 can relax the requirements for band-pass filter 428.

In one example, I/Q mixer 426 functions to provide image rejection and mixing of intermediate oscillator signal 414, first split signal 422 and second split signal 424. The output signal from I/Q mixer 426 can be filtered by band-pass filter 428 to generate output signal to up converter 430 to be further processed by, for example, the up converter architecture of FIG. 6. In an example, output signal to up converter 430 is a higher-frequency signal than either lower-frequency signal 406 or analog waveform 416.

Figure 5:
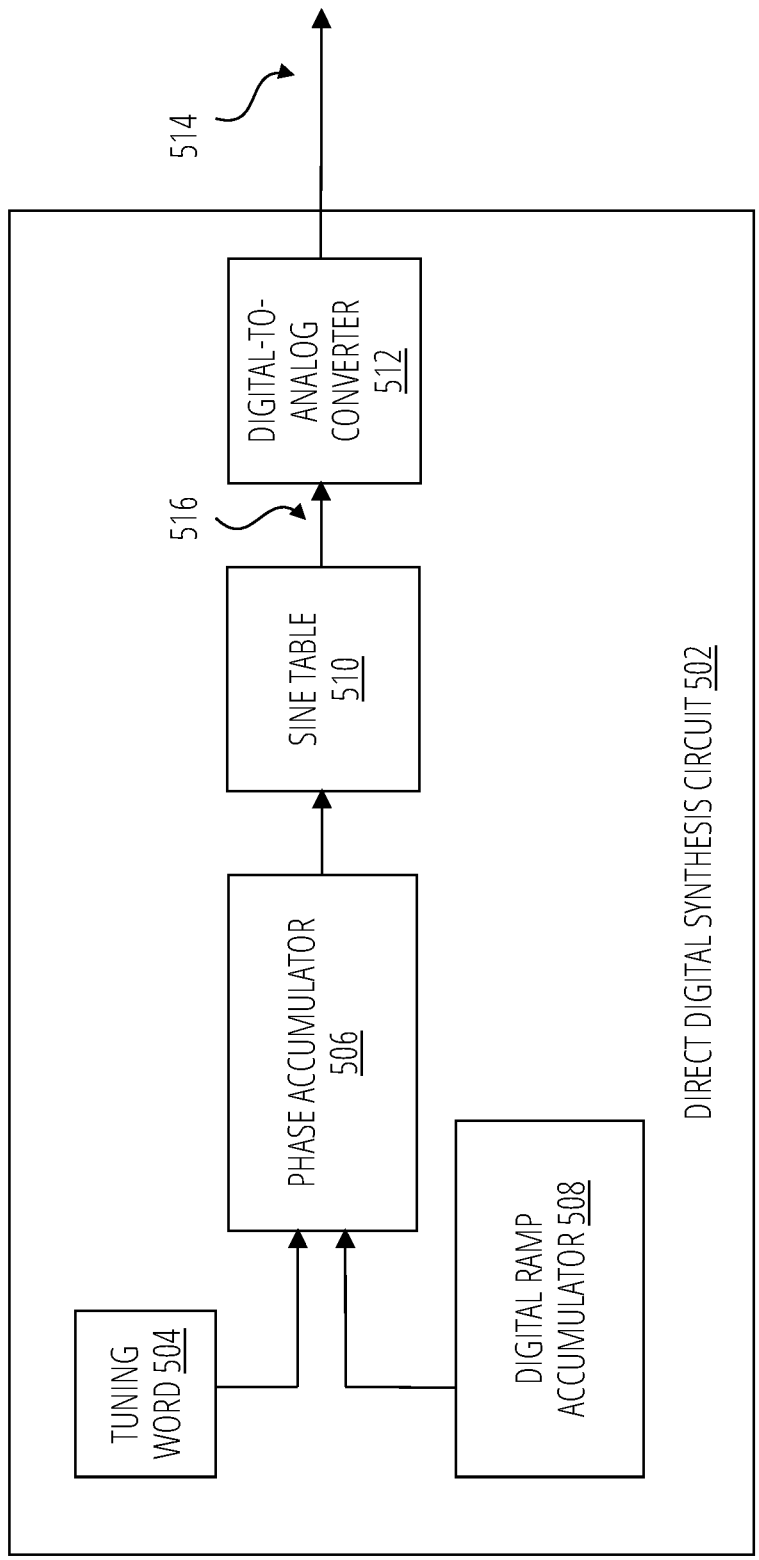
FIG. 5 is a block diagram of an example direct digital synthesis circuit.

FIG. 5 is a block diagram of an example direct digital synthesis circuit. The example direct digital synthesis circuit as illustrated in FIG. 5 can be analogous to direct digital synthesis circuit 304 or direct digital synthesis integrated circuit 404. The example architecture of FIG. 5 is one type of direct digital synthesis circuit that can be utilized in the systems of FIG. 1 to FIG. 4. Other direct digital synthesis circuit architectures can also be used.

In general, direct digital synthesis circuit 502 generates an output signal (e.g., analog waveform 514), which can be, for example, a sine wave at a selected frequency. Direct digital synthesis circuit 502 can also generate other waveforms, for example, square, triangular, etc. The frequency of analog waveform 514 depends on a reference clock signal provided to direct digital synthesis circuit 502 (not illustrated in FIG. 5) and a number represented by tuning word 504. In an example, tuning word 504 is a frequency register.

Phase accumulator 506 receives input signals from tuning word 504 and from digital ramp accumulator 508 to provide phase step information to sine table 510. In an example, digital ramp accumulator 508 provides digital waveform ramp information to cause phase accumulator 506 to generate the desired waveform shape.

Phase accumulator 506 provides an intermediate signal to sine table 510, which can be, for example, a sine look-up table that provides phase-to-amplitude conversion functionality. Sine table 510 generates digital waveform 516, which is a digital waveform having the characteristics determined by tuning word 504, digital ramp accumulator 508 and phase accumulator 506. Digital-to-analog converter 512 converts digital waveform 516 to corresponding analog waveform 514 to be used as, for example, described in FIG. 2 to FIG. 4.

FIG. 6 is a block diagram of an example up converter that can be used in an automotive radar system. The example up converter of FIG. 6 can be analogous to up converter 204 of FIG. 2. The up converter of FIG. 6 can function to receive input signal from signal generator 602 (e.g., corresponding to output signal to up converter 326 or output signal to up converter 430), which can be in a frequency range lower than the final radar signal frequency.

The received signal (input signal from signal generator 602) can be amplified by amplifier 604, filtered by low-pass filter 606 and the frequency can be increased (e.g., doubled) by frequency multiplier 608. The signal can then be filtered again by band-pass filter 610. In one example, intermediate up converter signal 612 has a frequency in the range of 19.4 GHz to 20.2 GHz. In other example configurations, different frequency ranges can be supported.

Intermediate up converter signal 612 can be provided to frequency multiplier 614 where the frequency increased again (e.g., doubled again) by frequency multiplier 614. Any number of stages of filtering and multiplying can be provided to convert the received signal (e.g., input signal from signal generator 602) to the desired output frequency having the desired signal characteristics. In one example, final radar frequency signal 616 is in the range of 38.8 GHz to 40.4 GHz. In other example configurations, other frequency ranges can be supported. This is just one example, frequency range and multiplier configuration. Other examples generating different frequencies could be based on different local oscillator (e.g., stable local oscillator 302, stable local oscillator 402), which could be filtered, amplified, and/or multiplied to achieve the desired radar frequency signal.

The output signal from frequency multiplier 614 (e.g., final radar frequency signal 616) can be sent to transmitter 618 to be transmitted (e.g., like transmitted radar signal 208) from the host platform (e.g., vehicle 102). A reflected signal (e.g., reflected radar signal 212) can be received by the host platform and processed as described above with respect to FIG. 2.

Figure 7:
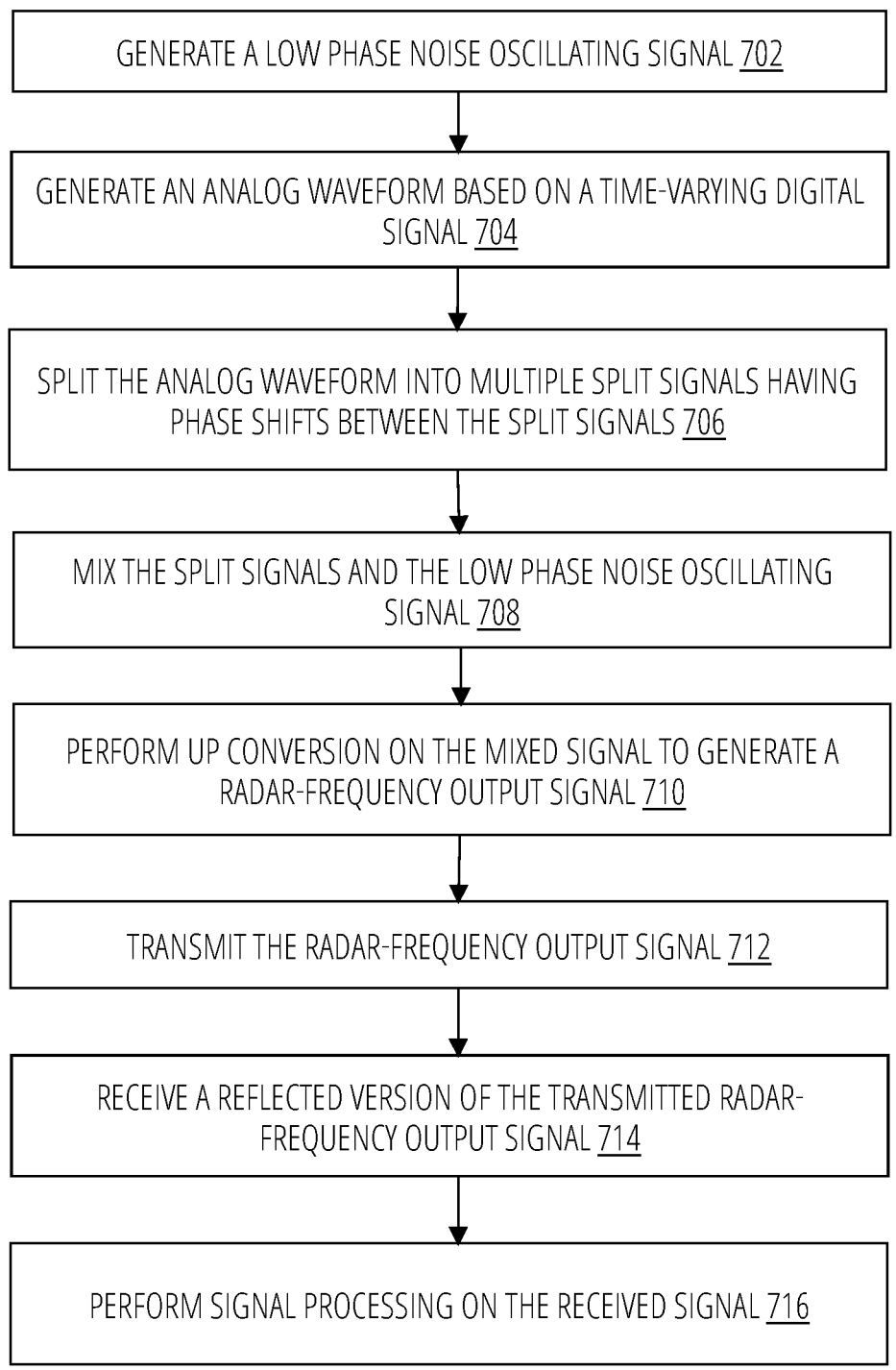
FIG. 7 is a flow diagram for one technique for generating a radar-frequency signal to be utilized by a host platform.

FIG. 7 is a flow diagram for one technique for generating a radar-frequency signal to be utilized by a host platform. The technique of FIG. 7 can be utilized by a host platform, for example, an autonomous vehicle (e.g., vehicle 102) having various sensors (e.g., sensors 104) and control systems (e.g., control service 126). In an example, the techniques described can be provided utilizing the circuits and architectures as described with respect to FIG. 2, FIG. 4 and FIG. 6. A corresponding technique for utilizing the architectures of FIG. 2, FIG. 3 and FIG. 6 would be adjusted to function with an image rejection mixer that receives a single input signal from the DDS branch (i.e., without a 90-degree hybrid coupler).

A low phase noise oscillating signal is generated, 702. In an example, the low phase noise oscillating signal can be generated by a stable local oscillator (e.g., stable local oscillator 302) that generates a lower-frequency signal (e.g., lower-frequency signal 306). The lower-frequency signal has a frequency that is less than a radar-frequency signal. In an example, the lower-frequency signal is in the range of 9 GHz and can be used in a heterodyne combination of signals to generate a radar-frequency signal. In some examples, the low phase noise oscillating signal can be filtered (e.g., high-pass filter 308, low-pass filter 312) and/or amplified (e.g., amplifier 310) before being combined with other signals.

An analog waveform is generated based on a time-varying digital signal, 704. In an example, the analog waveform (e.g., analog waveform 316) can be generated by a direct digital synthesis circuit (e.g., direct digital synthesis circuit 304). In an example, the analog waveform has a frequency that is less than the final radar-frequency signal and can be used in the heterodyne combination of signals to generate the radar-frequency signal. In some examples, the analog waveform can be filtered (e.g., band-pass filter 318) before being combined with other signals.

In one example (e.g., utilizing an architecture analogous to that of FIG. 4), the analog waveform (e.g., analog waveform 416) is split into multiple split signals having phase shifts between the split signals, 706. In an example, the analog waveform is split by a 90-degree hybrid coupler (e.g., 90-degree hybrid coupler 420) into two signals (e.g., first split signal 422, second split signal 424) having a 90 degree phase difference. In another example (e.g., utilizing an architecture analogous to that of FIG. 3), the analog waveform (e.g., analog waveform 416) is not split into two signals having a phase difference.

In the architecture having the 90-degree hybrid coupler, the split signals and the low phase noise oscillating signal (after filtering and/or amplifying) are mixed, 708. In an example, an I/Q mixer (e.g., image rejection mixer 320) can be utilized to mix the signals and provide image rejection. The mixed signal can be further filtered (e.g., band-pass filter 324) to provide a signal generator output signal (e.g., output signal to up converters 326). In the architecture without the 90-degree hybrid coupler, the filtered analog waveform and the low phase noise oscillating signal (after filtering and/or amplifying) can be mixed.

Up conversion can be performed on the mixed output signal to generate a radar-frequency output signal, 710. The up conversion can include filtering (e.g., low-pass filter 606, band-pass filter 610), amplification (e.g., amplifier 604) and/or frequency multiplication (e.g., frequency multiplier 608, frequency multiplier 614). The level of frequency multiplication to be used can be based on the relationship between the low-frequency signals in the signal generator and the desired radar-frequency output signal.

The radar-frequency output signal can be transmitted, 712. In an example, the radar-frequency output signal can be transmitted from a host platform (e.g., vehicle 102) to gather information related to other objects (e.g., remote vehicle 210) in an operating environment of the host platform. The transmitted radar-frequency signal can be reflected by one or more remote objects and the reflected signal can be received (e.g., via receive antenna 214), 714.

Signal processing can be performed on the received signal, 716. The signal processing can be used to determine various characteristics about remote objects including, for example, location, direction of travel, size, speed.

Figure 8:
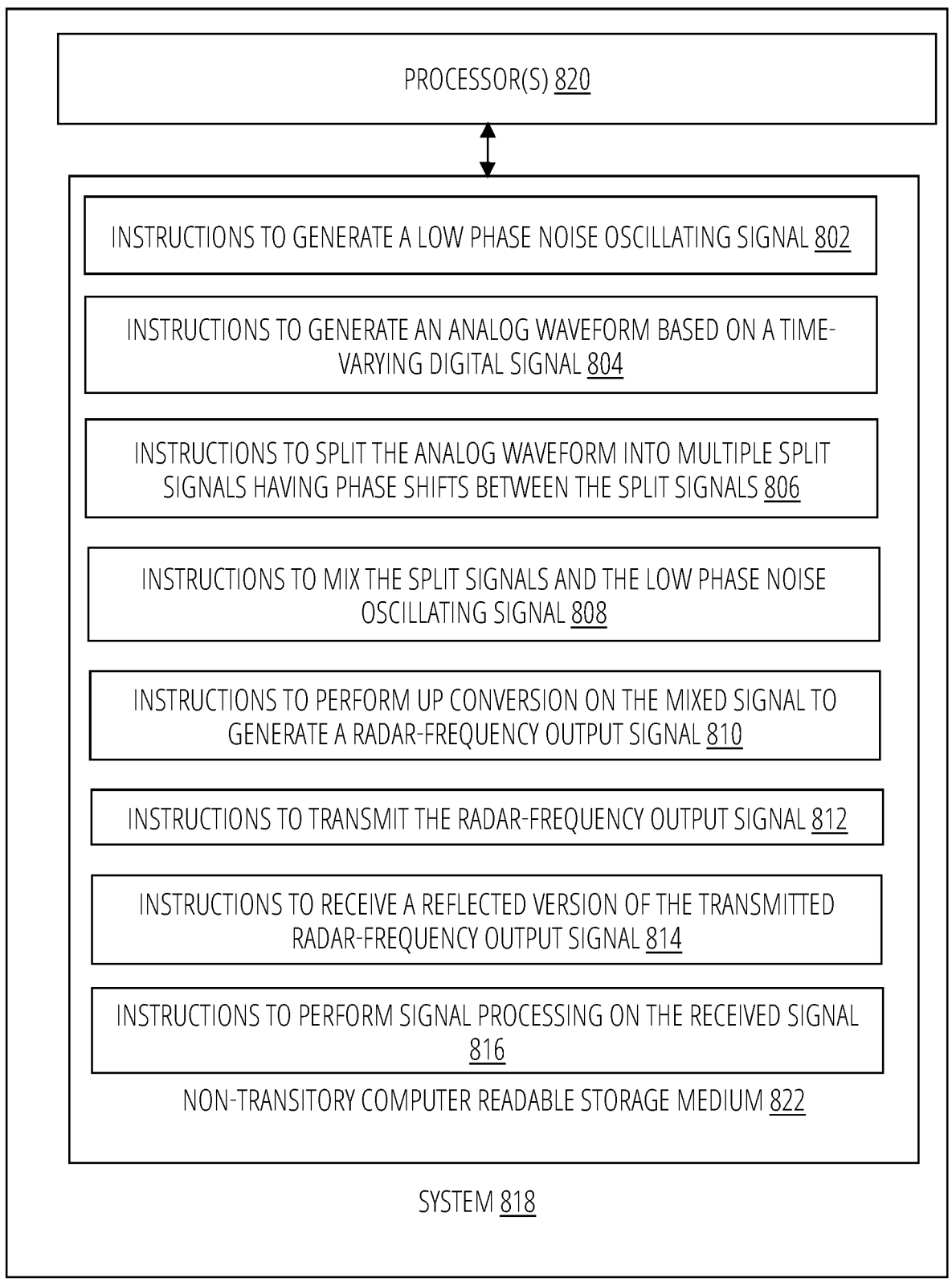
FIG. 8 is a block diagram of one example of a processing system that can generate a radar-frequency signal to be utilized by a host platform.

FIG. 8 is a block diagram of one example of a processing system that can generate a radar-frequency signal to be utilized by a host platform. In one example, system 818 can be part of an autonomous vehicle (e.g., vehicle 102 as part of internal computing system 124) that utilizes various sensors including radar sensors. In other examples, system 818 can be part of a human-operated vehicle having an advanced driver assistance system (ADAS) that can utilize various sensors including radar sensors. In an example, the processing system as described with respect to FIG. 8 can include and/or control the circuits and architectures as described with respect to FIG. 2, FIG. 3 and FIG. 6.

In an example, system 818 can include processor(s) 820 and non-transitory computer readable storage medium 822.

Non-transitory computer readable storage medium 822 may store instructions 802, 804, 806, 808, 810, 812, 814 and 816 that, when executed by processor(s) 820, cause processor(s) 820 to perform various functions. Examples of processor(s) 820 may include a microcontroller, a microprocessor, a central processing unit (CPU), a graphics processing unit (GPU), a data processing unit (DPU), an application-specific integrated circuit (ASIC), an field programmable gate array (FPGA), a system on a chip (SoC), etc. Examples of a non-transitory computer readable storage medium 822 include tangible media such as random access memory (RAM), read-only memory (ROM), electrically erasable programmable read-only memory (EEPROM), flash memory, a hard disk drive, etc.

Instructions 802 cause processor(s) 820 to cause a low phase noise oscillating signal to be generated. In an example, the low phase noise oscillating signal can be generated by a stable local oscillator (e.g., stable local oscillator 302) that generates a lower-frequency signal (e.g., lower-frequency signal 306). The lower-frequency signal has a frequency that is less than a radar-frequency signal. In an example, the lower-frequency signal is in the range of 9 GHz and can be used in a heterodyne combination of signals to generate a radar-frequency signal. In some examples, the low phase noise oscillating signal can be filtered (e.g., high-pass filter 308, low-pass filter 312) and/or amplified (e.g., amplifier 310) before being combined with other signals.

Instructions 804 cause processor(s) 820 to cause an analog waveform to be generated based on a time-varying digital signal. In an example, the analog waveform (e.g., analog waveform 316) can be generated by a direct digital synthesis circuit (e.g., direct digital synthesis circuit 304). In an example, the analog waveform has a frequency that is less than the final radar-frequency signal and can be used in the heterodyne combination of signals to generate the radar-frequency signal. In some examples, the analog waveform can be filtered (e.g., band-pass filter 318) before being combined with other signals.

Instructions 806 cause processor(s) 820 to cause the analog waveform to be split into multiple signals having phase shifts between the split signals. In one example (e.g., utilizing an architecture analogous to that of FIG. 4), the analog waveform (e.g., analog waveform 416) is split into multiple split signals having phase shifts between the split signals, 706. In an example, the analog waveform is split by a 90-degree hybrid coupler (e.g., 90-degree hybrid coupler 420) into two signals (e.g., first split signal 422, second split signal 424) having a 90 degree phase difference. In another example (e.g., utilizing an architecture analogous to that of FIG. 3), the analog waveform (e.g., analog waveform 416) is not split into two signals having a phase difference.

In the architecture having the 90-degree hybrid coupler, the split signals and the low phase noise oscillating signal (after filtering and/or amplifying) are mixed. In an example, an I/Q mixer (e.g., image rejection mixer 320) can be utilized to mix the signals and provide image rejection. The mixed signal can be further filtered (e.g., band-pass filter 324) to provide a signal generator output signal (e.g., output signal to up converters 326). In the architecture without the 90-degree hybrid coupler, the filtered analog waveform and the low phase noise oscillating signal (after filtering and/or amplifying) can be mixed.

Instructions 808 cause processor(s) 820 to cause the split signals and the low phase noise oscillating signal (after filtering and/or amplifying) to be mixed. In an example, an I/Q mixer (e.g., image rejection mixer 320) can be utilized to mix the signals and provide image rejection. The mixed signal can be further filtered (e.g., band-pass filter 324) to provide a signal generator output signal (e.g., output signal to up converters 326). In the architecture without the 90-degree hybrid coupler, the filtered analog waveform and the low phase noise oscillating signal (after filtering and/or amplifying) can be mixed.

Instructions 810 cause processor(s) 820 to cause up conversion to be performed on the mixed output signal to generate a radar-frequency output signal. The up conversion can include filtering (e.g., low-pass filter 606, band-pass filter 610), amplification (e.g., amplifier 604) and/or frequency multiplication (e.g., frequency multiplier 608, frequency multiplier 614). The level of frequency multiplication to be used can be based on the relationship between the low-frequency signals in the signal generator and the desired radar-frequency output signal.

Instructions 812 cause processor(s) 820 to cause the radar-frequency output signal to be transmitted. In an example, the radar-frequency output signal can be transmitted from a host platform (e.g., vehicle 102) to gather information related to other objects (e.g., remote vehicle 210) in an operating environment of the host platform.

Instructions 814 cause processor(s) 820 to receive reflected radar-frequency signals via, for example, a receive antenna (e.g., receive antenna 214). Instructions 816 cause processor(s) 820 to perform signal processing on the received signal. The signal processing can be used to determine various characteristics about remote objects including, for example, location, direction of travel, size, speed.

In one example, a RADAR system includes at least a signal generator (e.g., signal generator 202), an up converter (e.g., up converter 204) and a transmitter (e.g., transmitter 618). In an example, the signal generator includes at least a stable oscillator (e.g., stable local oscillator 302) that outputs a first lower-frequency signal (e.g., lower-frequency signal 306). The signal generator can further include a direct digital synthesis circuit (e.g., direct digital synthesis circuit 304) that outputs an analog waveform (e.g., analog waveform 316) by generating a time-varying signal in digital form and performing a digital-to-analog conversion to produce the analog waveform.

The RADAR system can further include an up converter (e.g., up converter 204) coupled with the signal generator to receive the signal generator output signal. The up converter to filter the signal generator output signal and to increase frequencies of the signal generator output signal to generate a filtered and frequency multiplied signal (e.g., final radar frequency signal 616).

The RADAR system can further include a transmitter (e.g., transmitter 618) coupled with the up converter to receive the filtered and frequency multiplied signal. The transmitter can transmit a corresponding radar output signal (e.g., transmitted radar signal 208) toward a remote target (e.g., remote vehicle 210).

In one example, the transmitted radar output signal is a frequency-modulated continuous-wave (FMCW) radar signal. In one example, the signal generator, the up converter and the transmitter reside within a vehicle (e.g., vehicle 102).

In an example, the RADAR system can further include a receiver (e.g., receive antenna 214) to receive a reflected RADAR signal (e.g., reflected radar signal 212) corresponding to the transmitted radar output signal. The RADAR system can further include a down converter (e.g., down converter 218) coupled to receive the reflected RADAR signal and to convert the reflected RADAR signal to a lower-frequency signal. The RADAR system can further include a digital-to-analog converter (e.g., analog-to-digital converter 224) coupled to receive the lower-frequency signal and to convert the received lower-frequency signal to a digital equivalent signal. The RADAR system can further include a signal processing unit (e.g., signal processing unit 226) coupled with the digital-to-analog converter to perform digital signal analysis on the digital equivalent signal.

In an example, an autonomous vehicle (e.g., vehicle 102) can include a sensor system (e.g., sensor systems 108) including at least a signal generator (e.g., signal generator 202) further comprising, which can include a stable oscillator (e.g., stable local oscillator 302) that outputs a first lower-frequency signal (e.g., lower-frequency signal 306). The signal generator can further include a direct digital synthesis circuit (e.g., direct digital synthesis circuit 304) that outputs an analog waveform (e.g., analog waveform 316) by generating a time-varying signal in digital form and performing a digital-to-analog conversion to produce the analog waveform.

The signal generator can further include a 90-degree coupler (e.g., 90-degree hybrid coupler 420) coupled to receive the analog waveform from the direct digital synthesis circuit. The 90-degree coupler can split the analog waveform into a first split signal (e.g., first split signal 422) and a second split signal (e.g., second split signal 424) with a 90-degree phase shift between the first split signal and the second split signal.

The signal generator can further include a mixer (e.g., image rejection mixer 320) coupled to receive the first lower-frequency signal from the stable oscillator, and the first split signal and the second split signal from the direct digital synthesis circuit, the mixer to mix the first lower-frequency signal, the first split signal and the second split signal to generate a signal generator output signal (e.g., output signal to up converter 326).

The autonomous vehicle can further include an up converter (e.g., up converter 204) coupled with the signal generator to receive the signal generator output signal. The up converter to filter and to increase frequencies of the signal generator output signal to generate a filtered and frequency multiplied signal (e.g., final radar frequency signal 616).

The autonomous vehicle can further include a transmitter (e.g., transmitter 618) coupled with the up converter to receive the filtered and frequency multiplied signal. The transmitter to transmit a corresponding radar output signal (e.g., transmitted radar signal 208) toward a remote target (e.g., remote vehicle 210).

The autonomous vehicle can further include an internal control system (e.g., internal computing system 124) having a control service (e.g., control service 126) coupled with the sensor system, the control system to control functionality of the autonomous vehicle based on signals from the sensor system.

In one example, a method can be performed where a first lower-frequency signal (e.g., lower-frequency signal 306) is generated with a low phase noise oscillator (e.g., stable local oscillator 302). An analog waveform (e.g., analog waveform 316) can be generated with a direct digital synthesis circuit (e.g., direct digital synthesis circuit 304). Two split signals (e.g., first split signal 422 and second split signal 424) can be generated from the analog waveform. The two split signals and the analog waveform can be mixed to generate an intermediate signal (e.g., output signal to up converter 326) having a first frequency. The intermediate signal can be multiplied to a higher, second frequency in a radar frequency range to generate an output radar signal (e.g., final radar frequency signal 616). The output radar signal can be transmitted.

In an example, the transmitted output signal can be a frequency-modulated continuous-wave (FMCW) radar signal. In an example, the output radar signal is transmitted from a host platform comprising a vehicle (e.g., vehicle 102). In an example, the vehicle is an autonomous vehicle.

In an example, a non-transitory computer readable storage medium (e.g., non-transitory computer readable storage medium 822) can store instructions (e.g., 802, 804, 806, 808, 810, 812, 814 816) to cause one or more processors (e.g., processor(s) 820) to accomplish the following. The instructions (802) can cause the processor(s) to generate a low phase noise oscillating signal. The instructions (804) can cause the processors(s) to generate an analog waveform based on a time-varying digital signal. The instructions (806) can cause the processor(s) to split the analog waveform into multiple split signals having phase shifts between the split signals. The instructions (808) can cause the processor(s) to mix the split signals and the low phase noise oscillating signal.

The instructions (810) can cause the processor(s) to perform up conversion on the mixed signal to generate a radar-frequency output signal. The instructions (812) can cause the processor(s) to transmit the radar-frequency output signal.

In some examples, the instructions (814) can further cause the processor(s) to receive a reflected version of the transmitted radar-frequency output signal. In some examples, the instructions (816) can cause the processor(s) to perform signal processing on the received signal.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 822 has stored thereon data representing sequences of instructions that, when executed by a processor(s) 820, cause the processor(s) 820 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A RADAR system comprising:
    a signal generator comprising:
        a stable oscillator that outputs a first lower-frequency signal,
        a direct digital synthesis circuit that outputs an analog waveform by generating a time-varying signal in digital form and performing a digital-to-analog conversion to produce the analog waveform, and
        a mixer coupled to receive the first lower-frequency signal from the stable oscillator, and a first split signal and a second split signal from the direct digital synthesis circuit, the mixer to mix the first lower-frequency signal, the first split signal and the second split signal to generate a signal generator output signal;
    an up converter coupled with the signal generator to receive the signal generator output signal, the up converter to filter and to increase frequencies of the signal generator output signal to generate a filtered and frequency multiplied signal, wherein the signal generator output signal is amplified by an amplifier, filtered by a low-pass filter, a frequency is increased by a frequency multiplier, and filtered by a band-pass filter to generate the filtered and frequency multiplied signal; and
    a transmitter coupled with the up converter to receive the filtered and frequency multiplied signal, the transmitter to transmit a corresponding radar output signal toward a remote target, wherein the first lower-frequency signal has a lower frequency than the radar output signal.

2. The RADAR system of claim 1 wherein the signal generator further comprises a 90-degree coupler coupled to receive the analog waveform from the direct digital synthesis circuit, the 90-degree coupler to split the analog waveform into a first split signal and a second split signal with a 90-degree phase shift between the first split signal and the second split signal.

3. The RADAR system of claim 1 wherein the transmitted radar output signal comprises a frequency-modulated continuous-wave (FMCW) radar signal.

4. The RADAR system of claim 1 further comprising:
    a receiver to receive a reflected RADAR signal corresponding to the transmitted radar output signal;
    a down converter coupled to receive the reflected RADAR signal and to convert the reflected RADAR signal to a second lower-frequency signal, wherein a frequency of the second lower-frequency signal is lower than a frequency of the reflected RADAR signal;

a analog-to-digital converter coupled to receive the second lower-frequency signal and to convert the received second lower-frequency signal to a digital equivalent signal; and a signal processing unit coupled with the analog-to-digital converter to perform digital signal analysis on the digital equivalent signal.

5. The RADAR system of claim 4 further comprising an autonomous vehicle control system coupled with the signal processing unit to receive processed reflected RADAR signals from the signal processing unit.

6. The RADAR system of claim 1, wherein the signal generator further comprises a second band-pass filter to filter an output signal from the mixer to generate the signal generator output signal.

7. The RADAR system of claim 1, wherein an intermediate up converted signal from the band-pass filter is provided to a second frequency multiplier, and wherein an output signal from the second frequency multiplier is the filtered and frequency multiplied signal.

8. The RADAR system of claim 1, wherein the mixer provides image rejection and mixing of signals generated by the stable oscillator and the direct digital synthesis circuit.

9. The RADAR system of claim 1, wherein the mixer is one of a sideband rejection mixer or a single sideband mixer.

10. An autonomous vehicle comprising:
a sensor system comprising at least:
a signal generator further comprising:
a stable oscillator that outputs a first lower-frequency signal,
a direct digital synthesis circuit that outputs an analog waveform by generating a time-varying signal in digital form and performing a digital-to-analog conversion to produce the analog waveform, and
a mixer coupled to receive the first lower-frequency signal from the stable oscillator, and a first split signal and a second split signal from the direct digital synthesis circuit, the mixer to mix the first lower-frequency signal, the first split signal and the second split signal to generate a signal generator output signal;
an up converter coupled with the signal generator to receive the signal generator output signal, the up converter to filter and to increase frequencies of the signal generator output signal to generate a filtered and frequency multiplied signal, wherein the signal generator output signal is amplified by an amplifier, filtered by a low-pass filter, a frequency is increased by a frequency multiplier, and filtered by a band-pass filter to generate the filtered and frequency multiplied signal; and
a transmitter coupled with the up converter to receive the filtered and frequency multiplied signal, the transmitter to transmit a corresponding radar output signal toward a remote target, wherein the first lower-frequency signal has a lower frequency than the radar output signal; and
an internal control system having a control service coupled with the sensor system, the control system to control functionality of the autonomous vehicle based on signals from the sensor system.

11. The autonomous vehicle of claim 10 wherein the signal generator further comprises a 90-degree coupler coupled to receive an analog waveform from the direct digital synthesis circuit, the 90-degree coupler to split the analog waveform into a first split signal and the second split signal with a 90-degree phase shift between the first split signal and the second split signal.

12. The autonomous vehicle of claim 10 wherein the transmitted output signal comprises a frequency-modulated continuous-wave (FMCW) radar signal.

13. The autonomous vehicle of claim 10 wherein the sensor system further comprises:
a receiver to receive a reflected RADAR signal corresponding to the transmitted output signal;
a down converter coupled to receive the reflected RADAR signal and to convert the reflected RADAR signal to a second lower-frequency signal, wherein frequency of the second lower-frequency signal is lower than a frequency of the reflected RADAR signal;
a digital-to-analog converter coupled to receive the second lower-frequency signal and to convert the received second lower-frequency signal to a digital equivalent signal; and
a signal processing unit coupled with the digital-to-analog converter to perform digital signal analysis on the digital equivalent signal.

14. A method comprising:
generating an oscillating signal with an oscillator;
generating an analog waveform based on a time-varying digital signal with a direct digital synthesis circuit;
splitting the analog waveform into two split signals having a phase difference between two split signals;
mixing the two split signals and the oscillating signal to generate an intermediate signal having a first frequency;
performing up conversion by multiplying intermediate signal frequency to a higher, second frequency in a radar frequency range to generate an output radar signal, wherein a signal is amplified by an amplifier, filtered by a low-pass filter, a frequency is increased by a frequency multiplier, and filtered by a band-pass filter to generate the output radar signal;
transmitting the output radar signal.

15. The method of claim 14 wherein the output radar signal comprises a frequency-modulated continuous-wave (FMCW) radar signal.

16. The method of claim 14 wherein the output radar signal is transmitted from a host platform comprising a vehicle.

17. The method of claim 14 further comprising:
receiving a reflected version of the transmitted output radar signal; and
performing signal processing operations on the reflected version of the transmitted output radar signal.

18. The method of claim 17 further comprising generating a signal to control a mechanical component of an autonomous vehicle based on results from the signal processing operations.

19. The method of claim 14 further comprising:
using a 90-degree coupler coupled to receive the analog waveform from the direct digital synthesis circuit, the 90-degree coupler to split the analog waveform into a first split signal and a second split signal with a 90-degree phase shift between the first split signal and the second split signal; and
mixing the first split signal, the second split signal and the oscillating signal.

20. The method of claim 14 wherein the oscillator comprises a stable local oscillator (STALO).

* * * * *